US011396305B2

(12) United States Patent
Urano et al.

(10) Patent No.: US 11,396,305 B2
(45) Date of Patent: Jul. 26, 2022

(54) SYSTEMS AND METHODS FOR IMPROVING DRIVER WARNINGS DURING AUTOMATED DRIVING

(71) Applicant: Toyota Research Institute, Inc., Los Altos, CA (US)

(72) Inventors: Hiromitsu Urano, Numazu (JP); Kentaro Ichikawa, Sunto-gun (JP); Junya Ueno, Susono (JP)

(73) Assignee: Toyota Research Institute, Inc., Los Altos, CA (US)

( * ) Notice: Subject to any disclaimer, the term of this patent is extended or adjusted under 35 U.S.C. 154(b) by 33 days.

(21) Appl. No.: 16/943,536

(22) Filed: Jul. 30, 2020

(65) Prior Publication Data

US 2022/0032939 A1 Feb. 3, 2022

(51) Int. Cl.
*B60W 50/14* (2020.01)
*B60W 60/00* (2020.01)
*B60W 40/09* (2012.01)
*B60W 50/04* (2006.01)
*G01S 19/42* (2010.01)

(52) U.S. Cl.
CPC .......... *B60W 50/14* (2013.01); *B60W 40/09* (2013.01); *B60W 50/04* (2013.01); *B60W 60/0025* (2020.02); *B60W 60/0051* (2020.02); *B60W 2520/00* (2013.01); *B60W 2540/30* (2013.01); *G01S 19/42* (2013.01)

(58) Field of Classification Search
None
See application file for complete search history.

(56) References Cited

U.S. PATENT DOCUMENTS

| 9,821,818 | B2 | 11/2017 | Cullinane et al. |
| 10,055,908 | B2 | 8/2018 | Slaton et al. |
| 10,241,509 | B1* | 3/2019 | Fields ............... G01C 21/3407 |
| 10,388,083 | B2* | 8/2019 | Lindelof ............... B60W 40/09 |
| 10,445,758 | B1 | 10/2019 | Bryer et al. |
| 11,077,858 | B2* | 8/2021 | Morimoto ............ B60W 40/09 |
| 11,247,670 | B1* | 2/2022 | Fields .................. B60W 40/09 |

(Continued)

FOREIGN PATENT DOCUMENTS

| DE | 102018129801 A1 | 5/2020 |
| EP | 3272610 A1 | 1/2018 |

(Continued)

OTHER PUBLICATIONS

Bryce Johnstone, "Autonomous Vehicles: Are We There Yet?," Electronic Design, Feb. 6, 2020, pp. 1-8.

(Continued)

*Primary Examiner* — Dale W Hilgendorf
(74) *Attorney, Agent, or Firm* — Christopher G. Darrow; Darrow Mustafa PC

(57) ABSTRACT

System, methods, and other embodiments described herein relate to improving driver warnings for automated driving by a vehicle. In one embodiment, a method includes monitoring a vehicle control system for driver feedback during the automated driving. The method also includes adapting a points value at a defined rate according to whether the driver feedback is present. The method also includes, responsive to determining that the points value satisfies a threshold before the driver feedback is present, generating a warning to a driver.

20 Claims, 9 Drawing Sheets

(56) References Cited

U.S. PATENT DOCUMENTS

| | | |
|---|---|---|
| 2008/0243558 A1 | 10/2008 | Gupte |
| 2016/0059775 A1 | 3/2016 | Gorse et al. |
| 2016/0152233 A1* | 6/2016 | Fung .................... B60W 40/09 701/41 |
| 2016/0207537 A1* | 7/2016 | Urano ................... B60W 50/16 |
| 2017/0061826 A1 | 3/2017 | Jain et al. |
| 2017/0066450 A1* | 3/2017 | Ko .................... B60W 50/0098 |
| 2018/0067486 A1 | 3/2018 | Yako et al. |
| 2018/0197440 A1 | 7/2018 | Ramachandra et al. |
| 2019/0019122 A1* | 1/2019 | Allen .................... G06Q 50/30 |
| 2019/0108768 A1* | 4/2019 | Mohamed ................ G09B 9/04 |
| 2019/0111945 A1* | 4/2019 | Wiegand .............. G05D 1/0246 |
| 2019/0265712 A1* | 8/2019 | Satzoda ............... G05D 1/0246 |
| 2019/0329773 A1 | 10/2019 | Shalev-Shwartz et al. |
| 2020/0148225 A1* | 5/2020 | Stefan ................... B60W 40/09 |
| 2020/0156654 A1* | 5/2020 | Boss ....................... G06N 20/00 |
| 2020/0239007 A1* | 7/2020 | Sobhany ............. B60W 50/087 |
| 2020/0342756 A1* | 10/2020 | MacKenzie .............. G08G 1/16 |
| 2021/0046946 A1* | 2/2021 | Nemec .............. B60W 60/0053 |
| 2021/0061300 A1* | 3/2021 | Adam .................. B60W 30/12 |

FOREIGN PATENT DOCUMENTS

| | | |
|---|---|---|
| WO | 2019092658 A1 | 5/2019 |
| WO | 2019122967 A1 | 6/2019 |

OTHER PUBLICATIONS

International Search Report and Written Opinion, EP Application No. 21188222, 8 pages.

* cited by examiner

SYSTEMS AND METHODS FOR IMPROVING DRIVER WARNINGS DURING AUTOMATED DRIVING

TECHNICAL FIELD

The subject matter described herein relates, in general, to improving automated vehicle operation, and, more particularly, to adapting driver warnings to improve automated driving.

BACKGROUND

Vehicles may be equipped with automated driving modules for autonomous driving as part of an automated driving system (ADS). An ADS of a vehicle may adapt to driving behavior, driving complexity, or driver feedback. The ADS adapting may improve operation in certain ADS modes that use driver feedback or interaction. In various approaches, an ADS of a vehicle may adapt driver warning systems according to driving behavior or driving complexity by testing in a special driving facility, a virtual training system, using special vehicle equipment, or the like. An ADS adapting through these methods may be time-intensive, inconvenient, or ineffective for varying driving behavior, driving complexity, or driver feedback.

Some automated driving modes may also operate requesting driving feedback within a time period before warning a driver. A vehicle system may request steering wheel feedback, braking feedback, or the like during a fixed time interval. For example, a lane-keeping assist (LKA) system may use steering wheel feedback to maintain safe operation. In one approach, the LKA system may reset a timer when a driver provides expected feedback to a steering wheel. The LKA system may otherwise generate a warning or notification if the timer expires before receiving driver feedback.

Furthermore, frequent driver feedback may be unnecessary if an ADS performs a simple maneuver of a vehicle. In this approach, a vehicle system may generate a warning or prompt when a fixed time interval expires regardless of the complexity of the automated driving maneuver or driving conditions. For example, an ADS maneuvering a vehicle straight on an empty, straight, or flat road may sometimes unnecessarily generate warnings because of the fixed time interval for warnings. Thus, current systems may be inefficient at effectively generating driver warnings during automated driving.

SUMMARY

In one embodiment, example systems and methods relate to a manner of improving driver warnings for an automated driving system (ADS) during driving. Certain ADS modes may request driver feedback for safe and effective automated driving. A vehicle operating in an ADS mode may generate a warning if driver feedback is not received within a fixed time period for automated driving to indicate insufficient driver interaction. However, driving behavior and driving states may vary, thereby frustrating the functioning of these systems. In various implementations, current solutions for an ADS adapting to driving behavior and driving states for driver warnings may be time-intensive, inconvenient, or ineffective. Therefore, an improved approach for automated driving is disclosed where a warning system uses a points value that adapts a time period before warning a driver. The warning system may adapt the points value to satisfy before warning the driver according to different feedback types, driving states, or the like. A vehicle system detecting driver feedback may cause adaptation of a points value. In one approach, the warning system may also vary the rate of adapting the points value according to the complexity of an automated driving state, driver feedback, driver awareness, or driver interaction. In this way, a vehicle adapts driver warnings to improve automated driving by adjusting time intervals according to driving behavior, driving complexity, or driving states.

In one embodiment, a warning system for improving driver warnings for automated driving by a vehicle is disclosed. The warning system includes one or more processors and a memory communicably coupled to the one or more processors. The memory stores a monitoring module including instructions that when executed by the one or more processors cause the one or more processors to monitor a vehicle control system for driver feedback during the automated driving. The memory also stores an adaptation module including instructions that when executed by the one or more processors cause the one or more processors to adapt a points value at a defined rate according to whether the driver feedback is present. The adaptation module further includes instructions to generate, responsive to a determination that the points value satisfies a threshold before the driver feedback is present, a warning to a driver.

In one embodiment, a non-transitory computer-readable medium for improving driver warnings for automated driving by a vehicle and including instructions that when executed by one or more processors cause the one or more processors to perform one or more functions is disclosed. The instructions include instructions to monitor a vehicle control system for driver feedback during the automated driving. The instructions also include instructions to adapt a points value at a defined rate according to whether the driver feedback is present. The instructions also include instructions to generate, responsive to a determination that the points value satisfies a threshold before the driver feedback is present, a warning to a driver.

In one embodiment, a method for improving driver warnings for automated driving by a vehicle is disclosed. In one embodiment, the method includes monitoring a vehicle control system for driver feedback during the automated driving. The method also includes adapting a points value at a defined rate according to whether the driver feedback is present. The method also includes, responsive to determining that the points value satisfies a threshold before the driver feedback is present, generating a warning to a driver.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving driver warnings for automated driving are disclosed herein. In one embodiment, a warning system may use a points value that adapts the manner of triggering a driver warning according to driver feedback, driving complexity, sensor data, or the like during certain automated driving system (ADS) modes. These ADS modes may use driver interaction, engagement, or attention associated with automated driving functions. Warnings are triggered less frequently by reducing the points value over time when a driver controls the vehicle. In one approach, the warning system may adapt the manner of triggering a warning by increasing, decreasing, or maintaining a defined rate of change of a points value during automated driving. For example, the warning system may increase or decrease a defined rate of change for the points value according to location or a dangerous maneuver to adapt the time period until triggering a driver warning. Thus, the adapted points value changes the time and manner of reaching a threshold which warns a driver more effectively during automated driving.

Moreover, the warning system may warn the driver so that driver awareness, interaction, engagement, or the like is sufficient for different automated driving conditions. For example, a warning type may vary according to the points value satisfying various thresholds. In one approach, an audible warning may precede a more severe haptic warning to the driver as the points value exceeds different thresholds over time during automated driving. In this way, a vehicle adapts driver warnings to improve automated driving by adjusting time intervals according to driving behavior, driving complexity, or driving states.

Figure 1:
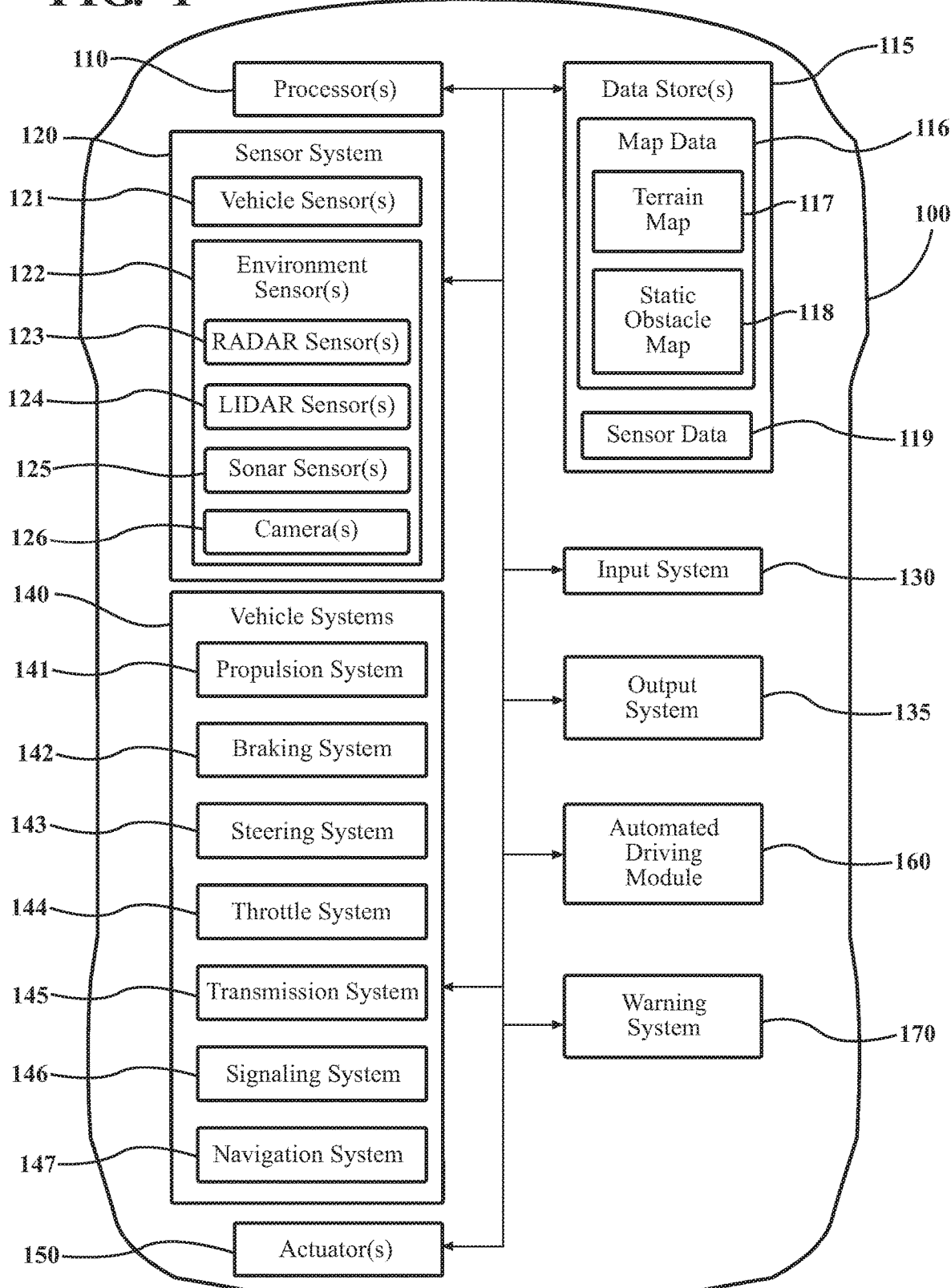
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles.

In some implementations, the vehicle 100 may be any robotic device or form of motorized transport that, for example, includes sensors to perceive aspects to operate in ADS mode. As further described herein, an ADS may comprise the automated driving module(s) 160, the parts of sensor system 120, the parts of vehicle systems 140, the actuators 150, and the data store(s) 115 that operate together to autonomously drive and control the vehicle 100 in ADS mode. In ADS mode, the vehicle 100 may use a warning system that adapts a point system during automated driving according to driver behavior or conditions associated with a driving scenario or maneuver. The warning system may generate a driver warning according to driver feedback and satisfying a threshold for an adapted points value. A warning may be an alarm, a displayed prompt, haptic feedback, or the like.

Furthermore, the vehicle 100 also includes various elements. It will be understood that in various embodiments, the vehicle 100 having all of the elements shown in FIG. 1 may be unnecessary. The vehicle 100 can have any combination of the various elements shown in FIG. 1. In addition, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-9 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 operates in an environment with improved driver warnings by using an adaptive point system during automated driving.

Figure 2:
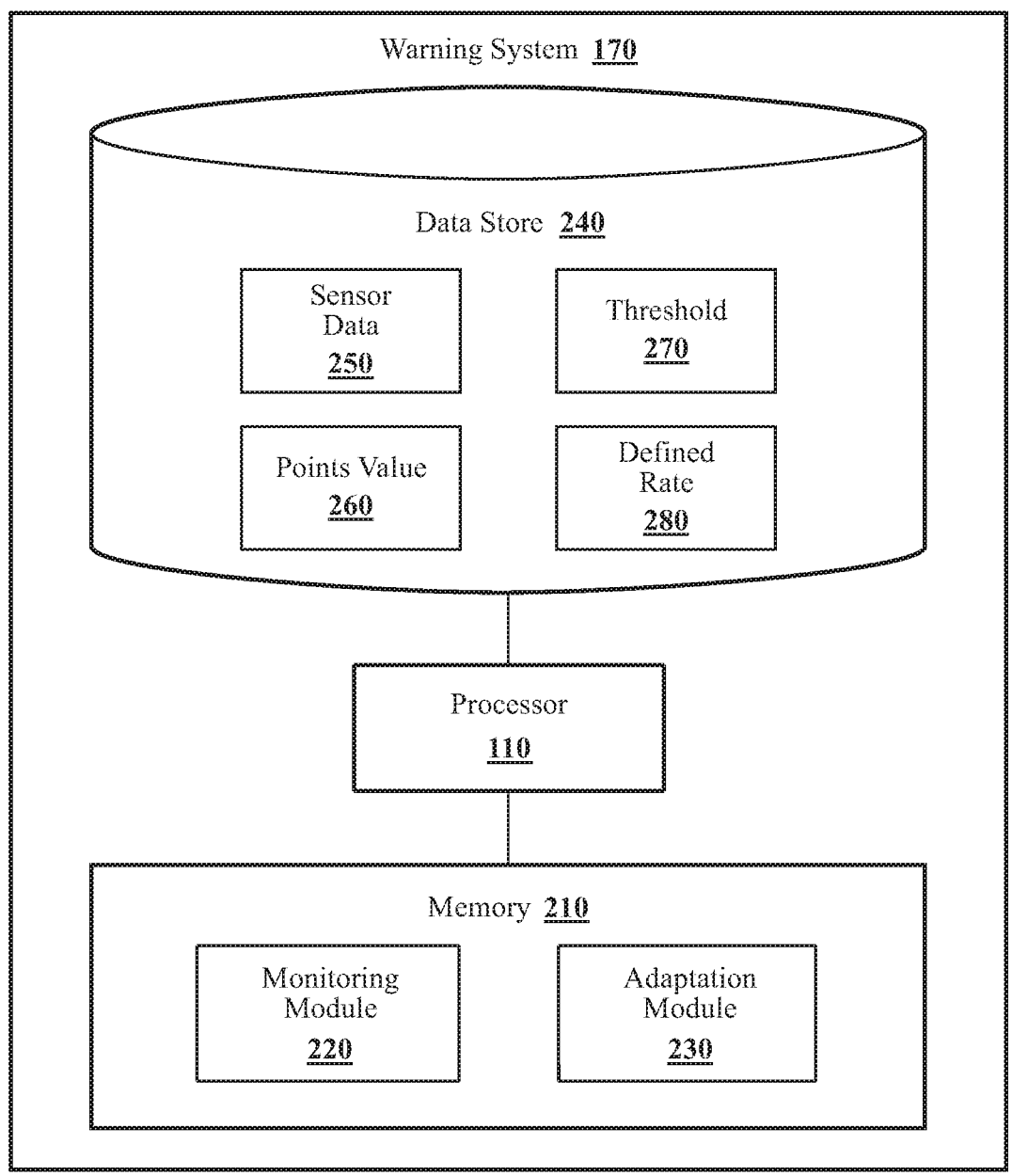
FIG. 2 illustrates one embodiment of a warning system to monitor driver feedback and generate driver warnings using an adaptive point system during automated driving of the vehicle in FIG. 1.

FIG. 2 illustrates one embodiment of a warning system to monitor driver feedback and generate driver warnings using an adaptive point system during the automated driving of the vehicle in FIG. 1. The warning system 170 is shown as including a processor 110 from the vehicle 100 of FIG. 1. Accordingly, the processor 110 may be a part of the warning system 170, the warning system 170 may include a separate processor from the processor 110 of the vehicle 100, or the warning system 170 may access the processor 110 through a data bus or another communication path. In one embodiment, the warning system 170 includes a memory 210 that stores a monitoring module 220 and an adaptation module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

The warning system 170 as illustrated in FIG. 2 is generally an abstracted form that includes the monitoring module 220 and the adaptation module 230. The monitoring module 220 and the adaptation module 230 may generally include instructions that function to control the processor 110 to receive data inputs from one or more vehicle systems or sensors of the vehicle 100. Modules 220 and 230, in one approach, may use the received data inputs to adapt the points value 260 during the automated driving of the vehicle 100. The monitoring module 220, in one embodiment, may control the respective sensors (e.g., inertial measurement unit (IMU), input sensors, etc.) to provide the data inputs in the form of the sensor data 250. In one approach, sensor data 250 may include vehicle input data from sensor data 119. The warning system 170 and the monitoring module 220 may use sensor data 250 to detect driver feedback during automated driving and accordingly adapt points value 260 to prevent premature driver warnings. For example, the warning system 170 may determine a maneuver by the driver is a takeover and reduce the points value 260. The points value 260 may be reduced below a threshold for a driver warning because of sufficient engagement during automated driving of the vehicle 100. This may indicate to the warning system 170 that the driver is aware of the operation of the vehicle 100 and the driver is performing the expected oversight of the vehicle 100 during the automated driving.

Additionally, the monitoring module 220 may acquire the sensor data 250 actively or passively. For example, the monitoring module 220 can passively sniff the sensor data 250 from a stream of electronic information provided by the various sensors to further components within the vehicle 100. Accordingly, the warning system 170 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors.

In general, the sensor data 250 includes at least the vehicle control inputs. The vehicle control inputs comprise, in one example, steering inputs (e.g., steering wheel angle, rate and direction of rotation, etc.), braking inputs (e.g., the extent of brake pedal activation/pressure), and acceleration inputs (e.g., the extent of accelerator pedal activation/pressure). In further aspects, the vehicle control inputs also specify transmission control inputs (e.g., gear selection), drive mode (e.g., 2-wheel drive, 4-wheel drive, etc.), engine/motor parameters (e.g., engine revolutions per minute (RPM), driving mode for hybrid vehicles, etc.), and so on. In yet further aspects, the sensor data 250 includes current dynamics data such as angular velocity, g-forces (e.g., longitudinal, lateral, etc.), speed profile, wheel speeds, activation controls (e.g., anti-lock brake system (ABS) activation, traction control activation, stability control activation, etc.), and so on.

As one example, according to a particular implementation, the vehicle 100 may include different versions of an IMU sensor that are separately capable of different measurements. That is, in one implementation, the IMU sensor may provide yaw rate, lateral acceleration, and longitudinal acceleration, whereas, in a separate implementation with a more robust IMU sensor, the IMU sensor may provide additional data such as pitch rates, roll rates, vertical acceleration, etc. As such, the warning system 170 may, in one or more approaches, be configured to adapt to different electronic inputs depending on the availability of such information. As an additional note, telematics data as used herein generally encompasses the sensor data 250 and may include further information such as vehicle identifiers, location information (e.g., global positioning system (GPS) position), and other information that may be used by the warning system 170 to generate warnings associated with the location for the vehicle 100.

Moreover, in one embodiment, the warning system 170 includes a data store 240. In one embodiment, the data store 240 is a database. The database is, in one embodiment, an electronic data structure stored in the memory 210 or another data store and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes the sensor data 250 along with, for example, metadata that characterize various aspects of the sensor data 250.

In one embodiment, the data store 240 also includes the points value 260, the threshold 270, and the defined rate 280. The warning system 170 may adapt (e.g., increase, decrease, etc.) the points value 260 in units or steps over time at the defined rate 280 according to driver feedback. The defined rate 280 may be a rate of increase, decrease, or step size for accumulating or reducing the points value 260. For example, the points value 260 may change at a rate of 0.7, 1, or 1.5 per second. The warning system 170 may use a higher rate for more complex or difficult driving environments during automated driving of the vehicle 100. In one approach, the warning system 170 may use a higher rate to trigger a warning for insufficient driver interaction, engagement, awareness, or the like during automated driving.

Furthermore, the automated driving module(s) (ADM) 160 may use an adapted points value 260 for generating a warning in ADM modes that use driver feedback. In one example, the warning system 170 may adapt the points value 260 according to a driver behavior, driving complexity, driving states, traffic states, a driver experience, or the like. A driver behavior may include a driver that frequently controls the vehicle 100 by touching the steering wheel according to perceived safety during automated driving. This driver behavior may be unnecessary if automated driving of the vehicle 100 satisfies conditions of a motion plan. In one approach, a takeover may reset the points value 260 since the driver is fully aware during the automated driving of the vehicle 100. A takeover during automated driving may be a driver maneuvering, braking, accelerating, or the like vehicle 100 instead of control by the automated driving module(s) 160. A driving state may include a scenario during automated driving that involves complex curves, intersections, lanes changes, or the like for a particular location. For example, a complex travel path may increase the defined rate 280 for the points value 260 to keep a driver attentive by triggering warnings more frequently.

Concerning road curves, the warning system 170 may shorten the time interval for triggering a warning by reducing the points value 260 for more driver awareness during automated driving on curvy roads. In addition, a traffic state may include traveling on a highway, urban environment, dense population area, high traffic volume, or the like. For example, the warning system 170 may set a lower points value 260 or the threshold 270 on the road with less vehicles. Long intervals to trigger warnings associated with safety may be sufficient in a light traffic driving environment. Conversely, the warning system 170 may operate with a higher points value 260 or the threshold 270 on the road with more vehicles to trigger driver warnings more frequently.

In one approach, the warning system 170 and the adaptation module 230 may adapt points according to a deceleration of the vehicle 100 at a certain rate during a dangerous driving state. In addition, the warning system 170 may adapt the points value 260 if the vehicle 100 maintains a stable velocity or distance with another vehicle according to sensor data 250. In one approach, the warning system 170 may reduce the points value 260 if the velocity of the vehicle 100 is low (e.g. 5 miles per hour (MPH)) or increase the points value 260 at higher velocities (e.g. 90 MPH) so that driver warnings adapt to speed during automated driving. The adaptation module 230 may decrease the points value 260 of the vehicle 100 where steering wheel feedback indicates sufficient responsiveness, attention, alertness, participation, or the like for automated driving of the vehicle 100. In this way, the vehicle 100 has an accurate and reliable system to generate driver warnings during certain ADS modes.

In the forthcoming examples, the monitoring module 220 and the adaptation module 230 of the warning system 170 may utilize the sensor data 250, the points value 260, and/or the threshold 270 stored in the data store 240 to adapt the warning system 170 during automated driving of the vehicle 100. In particular, the monitoring module 220 may use sensor data 250 and/or sensor data 119 for driver feedback from vehicle systems 140 during automated driving. The adaptation module 230 may adapt the points value 260 at the defined rate 280 according to whether the driver feedback is present. The warning system 170 generates a driver warning when subsequently determining that the points value 260 satisfies the threshold 270 while waiting for the driver feedback. Thus, the warning system 170 adapts a point system according to driver behavior or driving conditions to warn a driver more accurately and precisely during automated driving.

Figure 3:
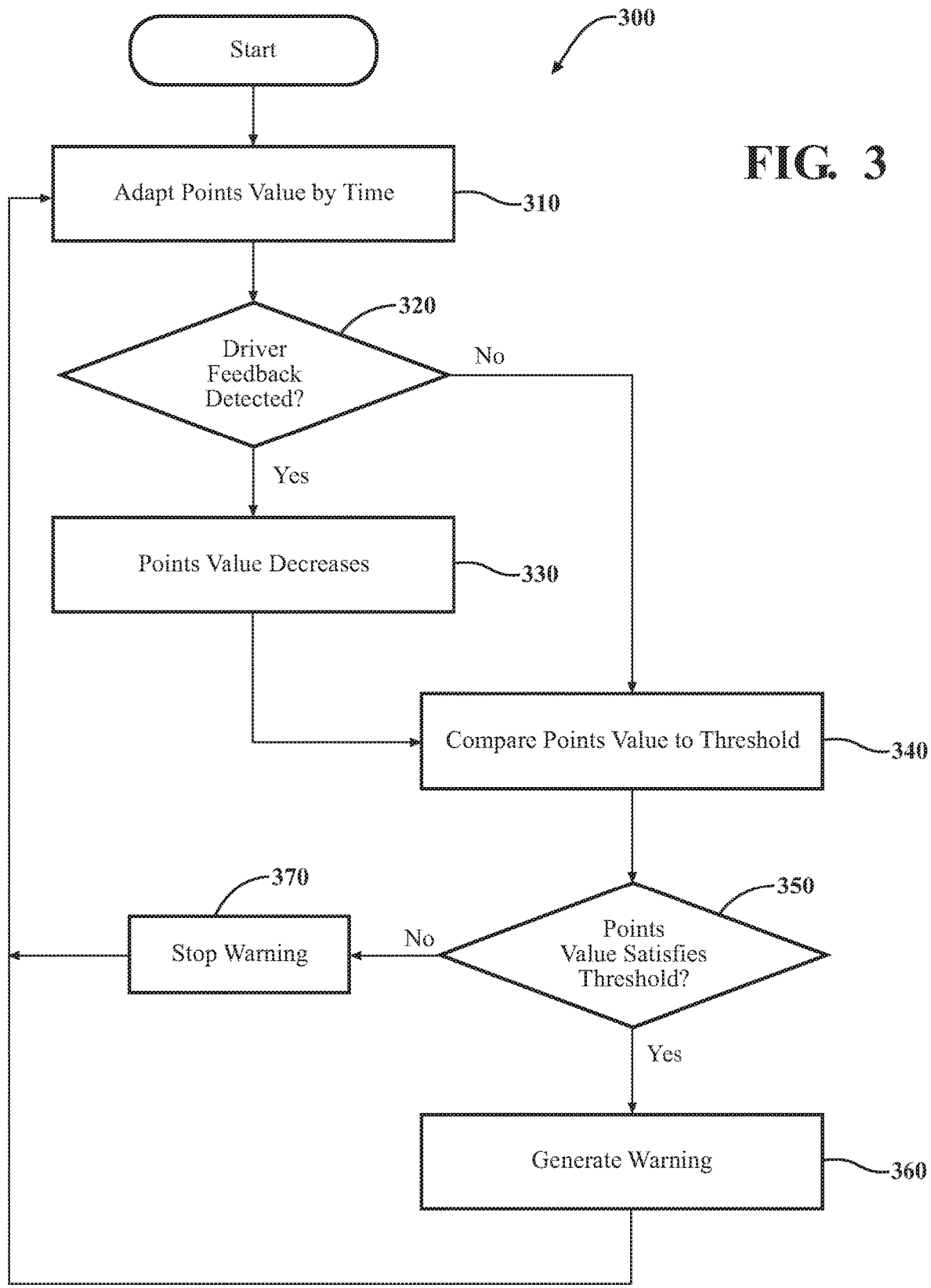
FIG. 3 illustrates one embodiment of a method that is associated with a warning system to monitor driver feedback using an adaptive point system during automated driving.

FIG. 3 illustrates one embodiment of a method that is associated with a warning system to monitor driver feedback using an adaptive point system during automated driving. Method 300 will be discussed from the perspective of FIGS. 1 and 2. While method 300 is discussed in combination with the warning system 170, it should be appreciated that the method 300 is not limited to being implemented within the warning system 170 but is instead one example of a system that may implement the method 300.

As a brief introduction to the method 300, prior to the discussion of the explicitly identified functions, the warning system 170 may monitor driver feedback during automated driving of the vehicle 100. The warning system 170 generates a driver warning after satisfying a threshold 270 associated with the adapted points value 260 for lack of the driver feedback in certain ADS modes. The warning system 170 may warn or notify the driver the current need for more attention, awareness, interaction, or the like for safer automated driving. Driver feedback may be inputs associated with handling, acceleration, braking, or the like according to the sensor data 250 used by certain ADS modes for operation.

As an example, the monitoring module 220 may use the sensor data 250 and/or the sensor data 119 for driver feedback from the vehicle systems 140 during automated driving of the vehicle 100. The adaptation module 230 may adapt a points value 260 at the defined rate 280 until receiving driver feedback. The warning system 170 and the adaptation module 230 adapt and adjust the points value 260 to trigger a driver warning during automated driving. For example, this may be achieved by changing the defined rate 280 for the points value 260 according to a driver state, driving complexity, driving conditions, vehicle location, or the like during automated driving of the vehicle 100.

Referring again to adapting driver warnings to improve automated driving in FIG. 3, at 310 the warning system 170 may adapt points value 260 over time. For example, the warning system 170 may adapt (e.g., increase, decrease, etc.) the points value 260 in units or steps over time at the defined rate 280. As explained herein, the defined rate 280 may be a rate of increase, decrease, or step size for accumulating or de-accumulating the points value 260. As explained herein, the warning system 170 may adapt the points value 260 according to driver behavior or driving complexity. In one approach, the defined rate 280 may increase when the vehicle 100 is traveling at a high velocity on a curvy road during automated driving. The defined rate may decrease if the vehicle 100 is traveling on the road with little traffic volume during automated driving. For each scenario, the warning system 170 adapts to warn the driver more frequently or less frequently during automated driving by accounting for specific aspects of the current context.

At 320, the monitoring module 220 may use the sensor data 250 and/or the sensor data 119 to detect driver feedback. The monitoring may include collecting and analyzing information about the driver in the form of the sensor data 250 and/or the sensor data 119. In one approach, the warning system 170 may analyze the sensor data 250 to determine when the driver is modifying control inputs of the vehicle 100. The warning system 170 may further analyze a specific character of the control inputs to further gauge the nature of the input by the driver. As one example, a measured intensity of a driver holding the steering wheel may determine if a takeover of the vehicle 100 is likely. The warning system 170 may decrease the points value 260 after a takeover since a warning is unnecessary due to driver control. In another example, the warning system 170 may use a detected gaze of the driver feedback to gauge driver attention, awareness, or the like. The warning system 170 may increase points value 260 at a higher defined rate 280 if the driver is looking outside of a viewing range for insufficient engagement during automated driving of the vehicle 100.

At 330, the warning system 170, after detecting the driver feedback at 320, decreases the points value 260. The warning system 170 may decrease the points value 260 according to a comparison to the threshold 270. In one approach, the rate of decrease may be dependent on the defined rate 280. As explained herein, the defined rate 280 may be a rate of increase, decrease, or step size for accumulating or de-accumulating the points value 260. The adaptation module 230 may use a higher rate for more complex or difficult driving environments during automated driving for more driver engagement or awareness needed in certain ADS modes. The warning system 170 may use a higher defined rate 280 to keep a driver more engaged for certain automated driving modes by frequently triggering warnings. Conversely, the warning system 170 may use a lower defined rate 280 to trigger warnings less frequently during automated driving for simpler driving environments.

At 340, if the monitoring module 220 does not detect the presence of driver feedback, the adaptation module 230 may compare the points value 260 to threshold 270. In particular, the adaptation module 230 may determine if the points value 260 satisfies the threshold 270 in the data store 240. The threshold 270 may be satisfied when the points value 260 is equal to or greater than the threshold 270. As further explained herein, the warning system 170 may use multiple thresholds with each threshold level triggering a different alarm according to one or more dangerous scenarios. As explained herein, the points value 260 may increase or decrease over time until satisfying the threshold 270 that triggers a warning according to a driver behavior, driving complexity, driving states, traffic states, a driver experience, or the like. For example, the warning system 170 may reduce the points value 260 if the speed and direction of the vehicle 100 is stable or otherwise rapidly increase the points value 260 so that driver warnings adapt accordingly during automated driving.

At 350, the adaptation module 230 determines that the points value 260 satisfies the threshold 270. The points value 260 may significantly overshoot the threshold 270 to critically warn the driver. In another approach, the warning system 170 may gradually increase the points value 260 to reach the threshold 270. The warning system 170 may determine that driver engagement, interaction, or the like for automated driving of the vehicle 100 is insufficient when the points value 260 satisfies the threshold 270.

At 360, the warning system 170 and the adaptation module 230 may warn the driver of the vehicle 100. A warning may be visual, auditory, haptic, or the like. In one approach, the warning system 170 may adapt the amount or level of a warning from low to highly urgent according to the exceeded amount of the threshold 270. In one approach, the warning system 170 may use multiple thresholds with each threshold level triggering a different alarm according to one or more dangerous scenarios. For example, if the warning system 170 suddenly increased the defined rate 280 due to a possible collision, the threshold 270 may be greatly exceeded to generate an urgent alarm.

At 370, the warning system 170 may stop or cancel a warning(s). In certain scenarios, the warning system 170 may have to stop or cancel a warning before the adaptation module 230 determines that the points value 260 does not satisfy the threshold 270. In one approach, the warning system 170 may continue to adapt the points value 260 after a stopped warning(s).

Figure 4:
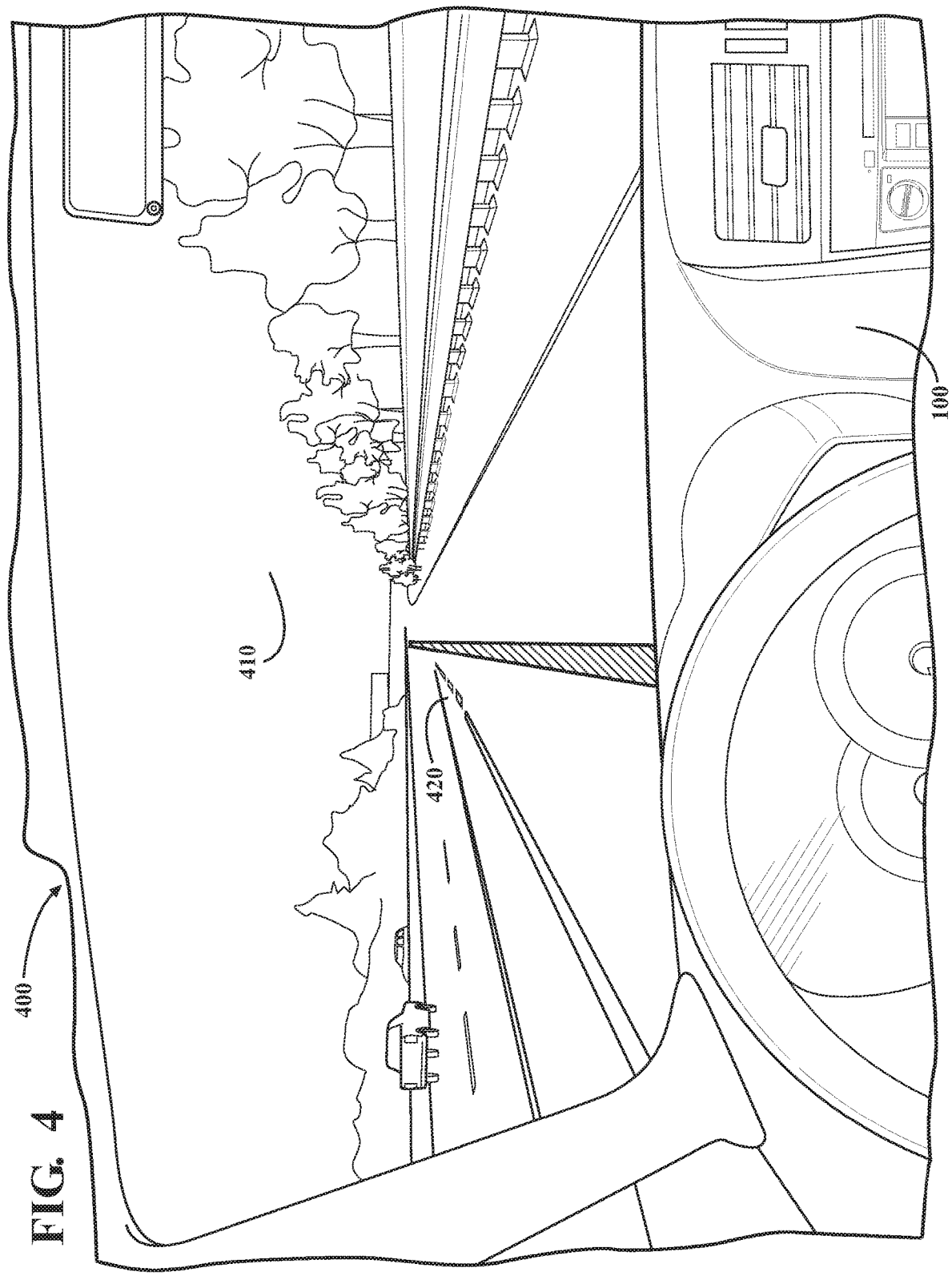
FIG. 4 is a diagram that illustrates a driving environment that adapts warnings for automated driving on the road with other vehicles.

Turning now to FIG. 4, the diagram illustrates a driving environment that adapts warnings for automated driving 400 on the road with other vehicles. In FIG. 4, the warning system 170 may adapt the points value 260 during automated driving according to driving behavior, driving complexity, driving conditions, driving states, or the like on an expressway. The driving environment 410 may include the vehicle 100 traveling on the expressway 420. If the driving environment 410 meets a safety standard of the vehicle 100, the warning system 170 may adapt points value 260 while vehicle 100 travels on expressway 420. The warning system 170 may adapt the points value 260 to provide more precise driver warnings during automated driving. In this approach, other vehicles on expressway 420 may result in the points value 260 increasing rapidly for more frequent warnings. As a result, the warning system 170 may demand more driver attention for automated driving on a high-speed road with more vehicles. In this way, the warning system 170 warning a driver more frequently may improve the safety and the reliability of automated driving.

Figure 5:
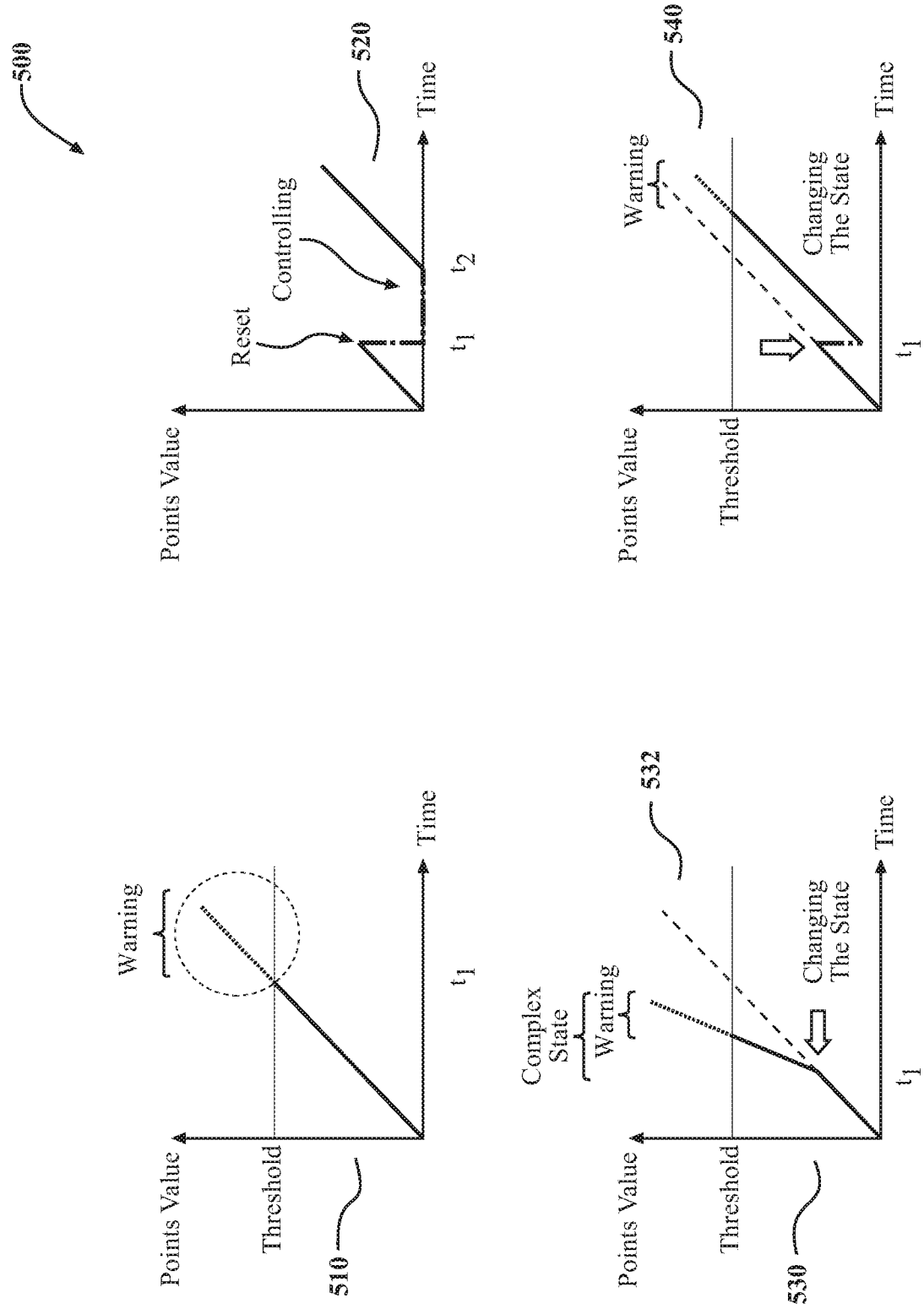
FIG. 5 is a diagram that illustrates using a point system during automated driving to generate warnings according to driver takeover or a driving complexity of the automated driving mode.

FIGS. 5-9 will now be discussed and illustrate various scenarios and examples for adapting the warning system 170. FIG. 5 is a diagram that illustrates using a point system 500 during automated driving of the vehicle 100 to generate warnings according to driver takeover or a driving complexity. The warning system 170 may accumulate the points value 260 in the point system 510 over time when driver feedback is not present using a fixed defined rate 280. The point system 510 may not adapt to driver behavior, driving complexity, driver states, or the like. The warning system 170 may also generate a driver warning without detecting driver feedback before reaching the threshold 270. In another approach, the warning system 170 and the adaptation module 230 in the point system 520 may reset the points value 260 at $t_1$ to zero according to a driver takeover of the vehicle 100. The points value 260 may remain at zero while the driver controls the vehicle 100 and begins increasing at $t_2$ once automated driving restarts of the vehicle 100. In this way, the point system 520 adapts driver warnings according to a driver takeover in a period of disengaging and engaging automated driving mode.

Moreover, the warning system 170 and the adaptation module 230 in point system 530 may use an increased defined rate 280 at $t_1$ to adapt to a complex, dangerous, or the like driving state during the automated driving of the vehicle 100. The warning system 170 changes from point function 532 according to the change in state to increase safety by more frequently warning a driver during automated driving. In one approach, the warning system 170 in point system 540 may reduce the points value 260 at $t_1$ according to the monitoring module 220 detecting driver feedback and continue to increase at a defined rate 280 after the driver feedback. In this way, the point systems 530 and 540 adapt warnings according to a driving state change or driver feedback during automated driving mode.

Figure 6:
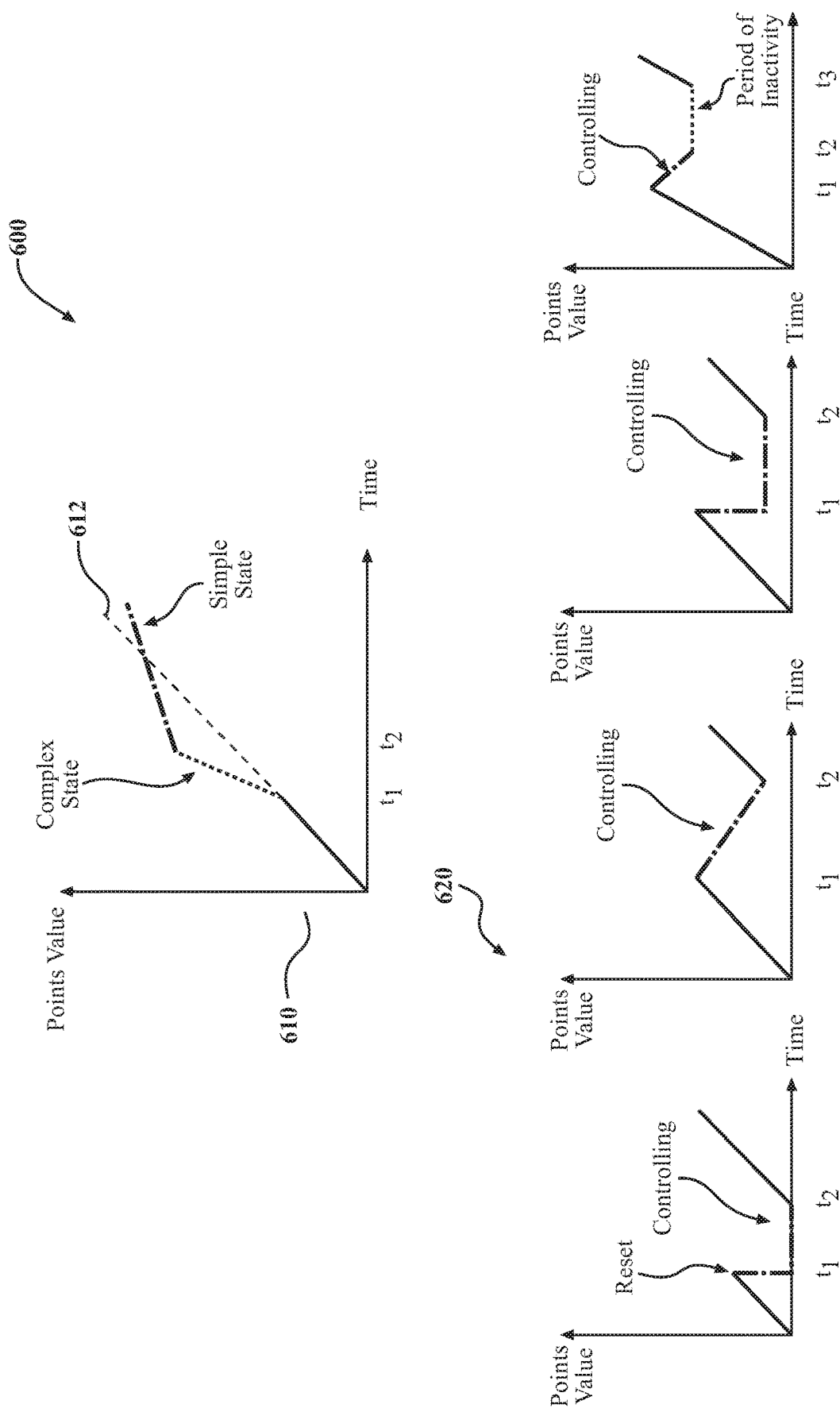
FIG. 6 is a diagram that illustrates using an adaptive point system to generate warnings according to varying driving complexity of the automated driving mode.

FIG. 6 is a diagram that illustrates using an adaptive point system 600 to generate warnings according to varying driving complexity of the automated driving mode. In one approach, the warning system 170 in point system 610 may transition to a higher defined rate 280 at $t_1$ to adapt to a complex, dangerous, or the like driving state during automated driving of the vehicle 100. A complex driving state may be a driving environment that includes many moving objects, vehicles, pedestrians, bicycles, or the like. The complex driving state may also include a hilly terrain, steep slopes, intersections, junctions, unpaved roads, winding roads, occlusions, blind spots, poor visibility, high velocity, or the like. The warning system 170 may reduce the defined rate 280 at $t_2$ when entering a simpler driving state during automated driving of the vehicle 100. For example, a simple driving state may be a driving environment that includes include few moving objects, vehicles, pedestrians, bicycles, or the like. The simple driving state may also include flat roads, gentle slopes, paved road, straight roads, good visibility, lower velocity, or the like. In this way, the warning system 170 adapts the point system 610 instead of using point function 612 to improve safety by getting a driver's attention sooner at $t_1$ during a complicated maneuver by the vehicle 100.

Furthermore, the warning system 170 using the point systems 620 may adapt the points value 260 according to a reset and a driver takeover, a reduced defined rate 280 during driver control, or a reset and a driver takeover during time periods $t_1$ and $t_2$ of automated driving. In addition, the warning system 170 may adapt the points value 260 according to a driver takeover that results in a reduced defined rate 280 during driver control and a period of inactivity during time periods $t_1$-$t_3$ of automated driving. In one approach, when a driver controls a vehicle as part of certain automated driving modes, less frequent warnings are needed. The monitoring module 220 may find that driver feedback is present according to touching, grabbing, turning, or the like of the steering wheel of the vehicle 100. Other examples of driver feedback may be a driver engaging the gas pedal, engaging the brake pedal, turning on a turn signal, or the like of the vehicle 100. In point system 620, the warning system 170 may substantially continuously reduce the points value 260 while a driver controls the vehicle 100.

Figure 7:
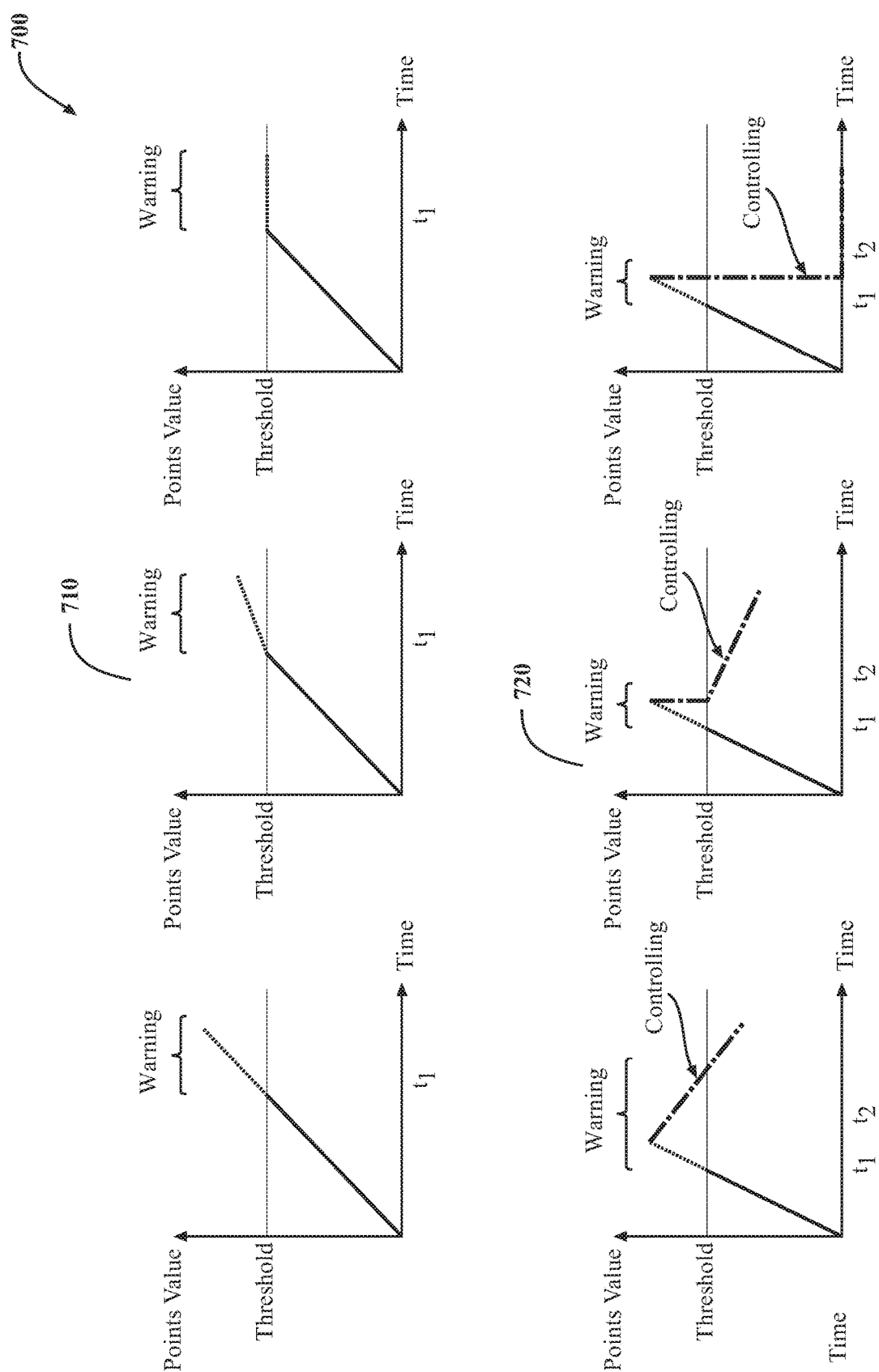
FIG. 7 is a diagram that illustrates using an adaptive point system where a defined rate of change varies to generate warnings during automated driving.

FIG. 7 is a diagram that illustrates using an adaptive point system 700 where a defined rate of change varies to generate warnings during automated driving. In one approach, the warning system 170 in the point systems 710 may change or reduce to zero the value of the defined rate 280 after $t_1$ once the points value 260 satisfies the threshold 270. The warning system 170 changing or reducing to zero the value of the defined rate 280 may be performed according to driver behavior, driving complexity, driving conditions, or the like. For example, the vehicle 100 may be transitioning to an area with less traffic needing less frequent warnings during automated driving. In one approach, the point systems 720 may adapt when the points value 260 satisfies the threshold 270 between $t_1$ and $t_2$ due to driver control during automated driving of the vehicle 100. For example, driver control may reduce the points value 260 below the threshold 270 to end or stop the warning. The points value 260 may have accumulated because the driver was sleepy or unaware during the automated driving of the vehicle 100. The warning may wake the driver to control the vehicle 100. The warning system 170 may decrease the value at the defined rate 280 or reset the points value 260 according to an amount of driver awareness or attention after the warning at $t_1$. In this way, the warning system 170 automatically adapts by returning to the pre-warning state according to driver behavior, habit, driving complexity, or the like to improve warnings during automated driving.

Figure 8:
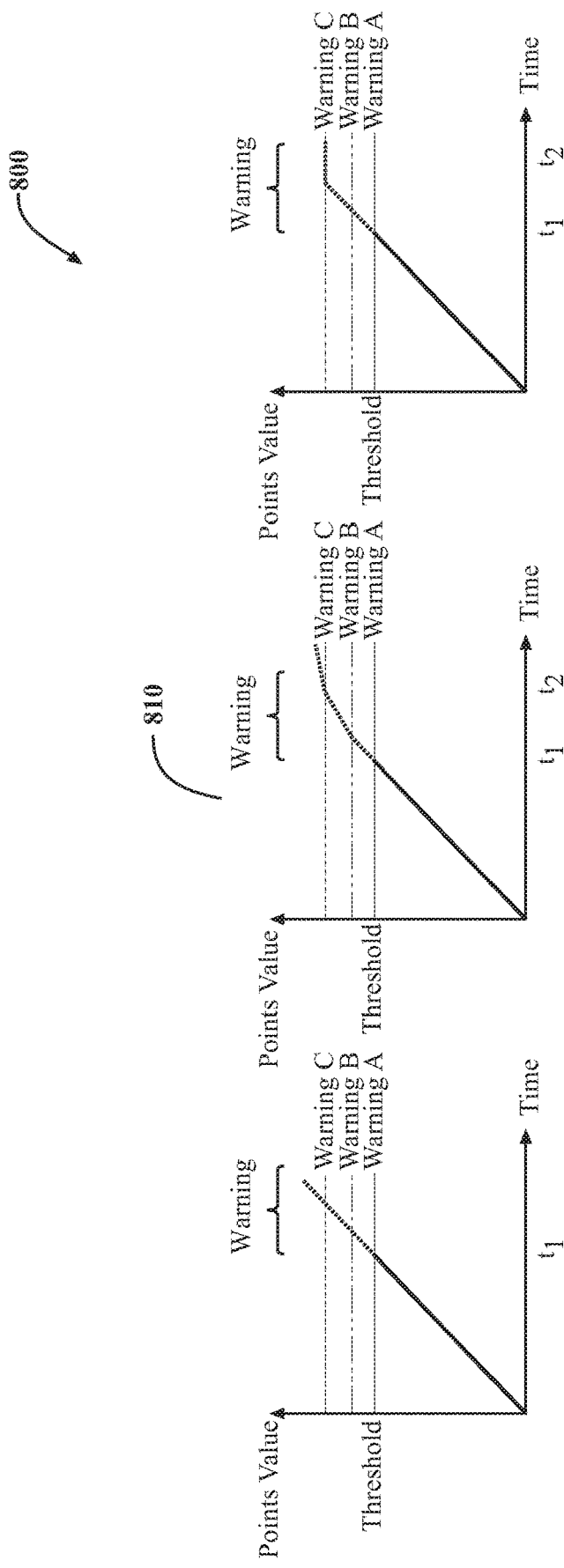
FIG. 8 is a diagram that illustrates using an adaptive point system where different types of driver warnings are provided after satisfying a threshold during automated driving.

FIG. 8 is a diagram that illustrates using an adaptive point system 800 where a warning system provides different types of driver warnings after satisfying a threshold during automated driving. The warning system 170 using the point system 810 may adapt the points value 260 according to driver control or inactivity at or between transition points $t_1$ or $t_2$. The points value 260 may stay constant without driver control of the vehicle 100 after $t_1$. The points value 260 may also decrease after $t_2$ with driver control. In this way, the warning system 170 automatically adapts according to driver control and inactivity to improve warnings during automated driving of the vehicle 100.

In one approach, the warning system 170 may use the point system 810 that includes multiple values or levels associated with the threshold 270. For example, the warning system 170 may generate an audible warning when the points value 260 satisfies a "Warning A" threshold at $t_1$. The warning system 170 may also generate a visual warning when the points value 260 satisfies a "Warning B" threshold. The warning system 170 may also generate a haptic warning when the points value 260 satisfies "Warning C" threshold. Furthermore, the warning system 170 may adapt defined rate 280 according to driving behavior, driving conditions, driving complexity, driver states, or the like at or between times $t_1$ or $t_2$. In this way, the warning system 170 improves driver warnings by adapting the types and levels of driver warnings to changing conditions.

Figure 9:
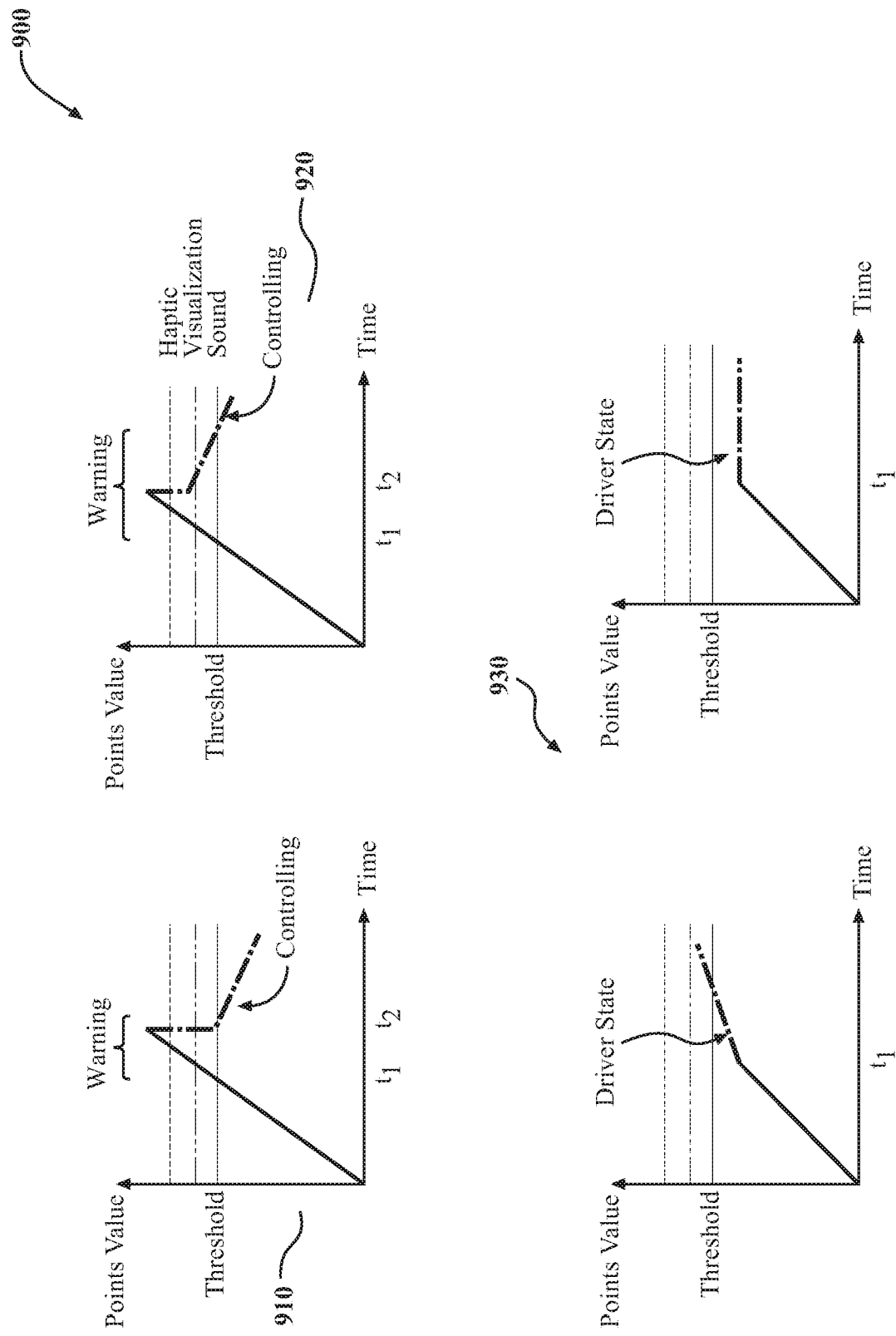
FIG. 9 is a diagram that illustrates using an adaptive point system where a defined rate varies according to a driver state during automated driving.

FIG. 9 is a diagram that illustrates using an adaptive point system 900 where a defined rate varies according to a driver state during automated driving. The warning system 170 using the point system 910 may adapt the points value 260 according to driver behavior and control during automated driving of the vehicle 100. For example, the warning system 170 may reset the points value 260 at $t_2$ to a minimum warning threshold when satisfying a highest threshold level. In one approach, the warning system 170 in the point system 920 may selectively change or transition the points value 260 from a highest haptic warning level to a middle visualization warning level. The warning system 170 may subsequently reduce the points value 260 to pass the lowest sound warning threshold level according to driver interaction or driving states during automated driving of the vehicle 100. Furthermore, the warning system 170 may reduce the points value 260 at a defined rate 280 due to driver control after $t_2$.

Moreover, the warning system 170 in point system 930 may adapt the points value 260 according to a driver state. The warning system 170 may adapt the defined rate 280 according to the sensor data 119 or 250 associated with the driver state. For instance, gaze tracking or attention data may indicate that the driver is awake and accordingly the defined rate 280 is adapted at $t_1$. The warning system 170 may determine from the sensor data 119 or 250 that the driver is concentrating and sufficiently controlling the vehicle 100. As a result, the defined rate 280 may also reduce to zero at $t_1$ and the points value 260 remains constant until further adaptation is triggered.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in only a subset of possible modes.

In one or more embodiments, the vehicle 100 is an automated or autonomous vehicle. As an automated vehicle, the vehicle 100 may be configured to use an ADS to perform autonomous functions through the automated driving module(s) 160. As used herein, "autonomous vehicle" refers to a vehicle that is capable of operating in an autonomous, automated, or ADS mode (e.g., category 5, full automation). "Autonomous mode" or ADS mode refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain map(s) 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle map(s) 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more light detection and ranging (LIDAR) sensors 124 of the sensor system 120.

The sensor data 119 includes at least the vehicle control inputs. The vehicle control inputs comprise, in one example, steering inputs (e.g., steering wheel angle, rate and direction of rotation, etc.), braking inputs (e.g., the extent of brake pedal activation/pressure), and acceleration inputs (e.g., the extent of accelerator pedal activation/pressure). In further aspects, the vehicle control inputs also specify transmission control inputs (e.g., gear selection), drive mode (e.g., 2-wheel drive, 4-wheel drive, etc.), engine/motor parameters (e.g., engine RPM, driving mode for hybrid vehicles, etc.), and so on. In yet further aspects, the sensor data 119 includes current dynamics data such as angular velocity, g-forces (e.g., longitudinal, lateral, etc.), speed profile, wheel speeds, activation controls (e.g., anti-lock brake system (ABS) activation, traction control activation, stability control activation, etc.), and so on.

In some instances, at least a portion of the map data 116 and/or the sensor data 119 can be located in one or more data stores 115 located on-board the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect a position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), GPS, a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate to the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of each of the following: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo or infrared (IR) cameras.

The vehicle 100 can include an input system 130. An "input system" includes components or arrangements or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geo-location system.

The processor(s) 110 and/or the automated driving module(s) 160 can be operatively connected to communicate with the various vehicle systems 140 and/or individual components thereof. For example, the processor(s) 110 and/or the automated driving module(s) 160 can be in communication to send and/or receive information from the various vehicle systems 140 to control the movement of the vehicle 100. The processor(s) 110 and/or the automated driving module(s) 160 may control some or all of the vehicle systems 140 and, thus, may be partially or fully autonomous as defined by the Society of Automotive Engineers (SAE) 0 to 5 levels.

As another example, the processor(s) 110 and/or the automated driving module(s) 160 can be operatively connected to communicate with the various vehicle systems 140 and/or individual components thereof. For example, the processor(s) 110 and/or the automated driving module(s) 160 can be in communication to send and/or receive information from the various vehicle systems 140 to control the movement of the vehicle 100. The processor(s) 110 and/or the automated driving module(s) 160 may control some or all of the vehicle systems 140.

The processor(s) 110 and/or the automated driving module(s) 160 may be operable to control the navigation and maneuvering of the vehicle 100 by controlling one or more of the vehicle systems 140 and/or components thereof. For instance, when operating in an automated or autonomous mode, the processor(s) 110, and/or the automated driving module(s) 160 can control the direction and/or speed of the vehicle 100. The processor(s) 110 and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components responsive to receiving signals or other inputs from the processor(s) 110 and/or the automated driving module(s) 160. For instance, the one or more actuators 150 can include motors, pneumatic actuators, hydraulic pistons, relays, solenoids, piezoelectric actuators, or the like.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine the position and velocity of the vehicle 100. The automated driving module(s) 160 can determine the location of obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by an occupancy module. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, reversing, or the like. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), ROM, an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A warning system for improving alerts for automated driving by a vehicle, comprising:
one or more processors; and
a memory communicably coupled to the one or more processors and storing:
a monitoring module including instructions that when executed by the one or more processors cause the one or more processors to:
monitor a vehicle control system for driver feedback during the automated driving; and
an adaptation module including instructions that when executed by the one or more processors cause the one or more processors to:
adapt a points value at a defined rate according to awareness from the driver feedback and a maneuver projected during the automated driving; and
generate, responsive to a determination that the points value satisfies a threshold according to the awareness by the driver feedback, a warning to a driver and signaling to disengage the automated driving.

2. The warning system of claim 1, wherein the adaptation module includes instructions to adapt the points value including instructions to adjust the points value from a decreased value upon determination of the driver feedback as a takeover of the vehicle and to restart the automated driving.

3. The warning system of claim 2, wherein the adaptation module includes instructions to adapt the points value including instructions to maintain the points value constant below the threshold before the automated driving restarts.

4. The warning system of claim 1, wherein the adaptation module includes instructions to adapt the points value including instructions to adapt the defined rate according to a complexity of driving maneuvers of the automated driving associated with a driving state that includes a location of the vehicle.

5. The warning system of claim 4, wherein the adaptation module includes instructions to adapt the points value including instructions to adapt the defined rate on a condition that the driver feedback is insufficient before satisfaction of the threshold.

6. The warning system of claim 1, wherein the adaptation module includes instructions to adapt the points value including instructions to adapt the defined rate according to a complexity of driving maneuvers of the automated driving associated with a velocity of the vehicle.

7. The warning system of claim 1, wherein the adaptation module includes instructions to adapt the points value including instructions to adapt the defined rate according to a driver state that includes a driver experience level.

8. The warning system of claim 1, wherein the adaptation module further includes instructions that when executed by the one or more processors cause the one or more processors to reset the points value to zero if the driver feedback is a driving maneuver that is a vehicle takeover.

9. A non-transitory computer-readable medium for improving driver warnings for automated driving by a vehicle and including instructions that when executed by one or more processors cause the one or more processors to:
monitor a vehicle control system for driver feedback during the automated driving;
adapt a points value at a defined rate according to awareness from the driver feedback and a maneuver projected during the automated driving; and
generate, responsive to a determination that the points value satisfies a threshold according to the awareness by the driver feedback, a warning to a driver and signaling to disengage the automated driving.

10. The non-transitory computer-readable medium of claim 9, wherein the instructions to adapt the points value include instructions to adjust the points value from a decreased value upon determination of the driver feedback as a takeover of the vehicle and to restart the automated driving.

11. The non-transitory computer-readable medium of claim 10, wherein the instructions to adapt the points value include instructions to maintain the points value constant below the threshold before the automated driving restarts.

12. The non-transitory computer-readable medium of claim 9, wherein the instructions to adapt the points value include instructions to adapt the defined rate according to a complexity of driving maneuvers of the automated driving associated with a driving state that includes a location of the vehicle.

13. A method, comprising:
monitoring a vehicle control system for driver feedback during automated driving;
adapting a points value at a defined rate according to awareness from the driver feedback and a maneuver projected during the automated driving; and
responsive to determining that the points value satisfies a threshold according to the awareness by the driver feedback, generating a warning to a driver and disengaging the automated driving.

14. The method of claim 13 further comprising adjusting the points value from a decreased value upon determining the driver feedback as a takeover of a vehicle and restarting the automated driving.

15. The method of claim 14 further comprising maintaining the points value constant below the threshold before the automated driving restarts.

16. The method of claim 13, wherein adapting the points value further comprises adapting the defined rate according to a complexity of driving maneuvers of the automated driving associated with a driving state that includes a location of a vehicle.

17. The method of claim 16, wherein adapting the points value further includes adapting the defined rate on a condition that the driver feedback is insufficient before satisfying the threshold.

18. The method of claim 13, wherein adapting the points value further comprises adapting the defined rate according to a complexity of driving maneuvers of the automated driving associated with a velocity of a vehicle.

19. The method of claim 13, wherein adapting the points value further comprises adapting the defined rate according to a driver state that includes a driver experience level.

20. The method of claim 13 further comprising resetting the points value to zero if the driver feedback is a driving maneuver that is a vehicle takeover.

* * * * *